: 2,998,443
Patented Aug. 29, 1961

2,998,443
PRODUCTION OF ACRYLONITRILE
Ahmad Kianpour and David W. McDonald, Texas City, Tex., assignors to Monsanto Chemical Company, St. Louis, Mo., a corporation of Delaware
No Drawing. Filed Oct. 29, 1958, Ser. No. 770,301
5 Claims. (Cl. 260—465.3)

The present invention relates to an improvement in the process for manufacturing acrylonitrile from hydrogen cyanide and acetylene in the vapor phase. More particularly, it relates to an improved catalyst for this reaction.

It is well known that acrylonitrile can be prepared by reacting hydrogen cyanide with acetylene in the vapor phase in the presence of a suitable catalyst. Many types of catalysts have been proposed for use in the reaction. Generally preferred are the alkali metal and alkaline earth metal hydroxides, cyanides and carbonates supported on porous materials having either a high surface activity or little or no surface activity, activated carbon, silica gel, alumina, pumice, graphite, beryl, and various refractory materials. It is common practice in this process, too, to employ a diluent gas such as nitrogen, hydrogen, helium, or the like in order to insure passage of the reactants through the reactor and to aid in accurately controlling the temperature within the reactor. However, the use of the preferred catalysts in the presence of appreciable quantities of hydrogen such as occur when this gas is used as a diluent or when dilute acetylene streams are used often leads to considerably lower yields of acrylonitrile than are obtained with an inert diluent such as nitrogen. It has now been discovered that high yields of acrylonitrile and reduced quantities of by-products, such as propionitrile and acetonitrile which are difficult to separate from the unsaturated nitrile, may be obtained even through the reaction is carried out in the presence of appreciable amounts of hydrogen if the catalyst contains as a promoter a small amount of a vanadium compound.

The process of the present invention consists in reacting hydrogen cyanide and acetylene in the vapor phase in the presence of an appreciable amount of hydrogen over a catalyst comprising an inert support impregnated with an alkali metal carbonate, hydroxide, or cyanide and containing a small amount of a vanadium compound such as ammonium vanadate, sodium vanadate, and the like. In the preferred embodiment of the invention, the inert support is a wood charcoal conditioned for use by calcining at a temperature in the range from 500° C. to 1000° C. and passing hydrogen over the heated charcoal until substantially all the adsorbed and combined oxygen has been removed together together with some tars and other impurities. This treated charcoal is then impregnated with about 10% by weight of a mixture of sodium and potassium carbonates and from about 0.2 to about 2.5% by weight of ammonium vanadate.

The following examples are presented to illustrate the invention but are not to be considered as limiting it in any manner whatsoever.

EXAMPLE 1

An unactivated wood charcoal known to the trade under the trademark "Char Glo" was ground through a 1B screen and screened. A selected mixture of 60% of the 30–40 mesh size and 40% of the 40–70 mesh size was calcined in a muffle furnace at 900° C. to 1000° C. for six hours. The charcoal was then heated at about 600° C. in a stream of hydrogen for about six hours. Finally, it was screened again to provide a mixture including the following mesh sizes: 30–40 mesh, 41.5%; 40–60 mesh, 53.5%; and 80–100 mesh, 5%.

Approximately 420 g. of the above described calcined hydrogenated charcoal was thoroughly stirred into a solution of 18.5 g. of sodium carbonate, 18.5 g. of potassium carbonate and 7 g. of ammonium meta vanadate in 500 ml. of distilled water and the mixture was allowed to stand over night. Excess water was evaporated from the slurry and it was dried by heating under vacuum over a steam bath. The dried catalyst containing approximately 10% by weight of the mixed alkali metal carbonates was screened to provide a mixture of the following mesh sizes for use: 30–40 mesh, 42.5%; 40–70 mesh, 46.5%; 80–100 mesh, 7.5%; and 100–140 mesh, 3.5%.

About 380 g. of the catalyst was transferred into a 2.2 in. I.D.×3 ft. high Pyrex reactor tube and the last traces of moisture were removed by fluidization with a stream of nitrogen heated to about 200° C. The temperature of the fluidized catalyst was then gradually brought up to 450° C. At this temperature, the nitrogen flow was discontinued and a gaseous mixture consisting of 2.2 liters/min. of acetylene, 0.66 liters/min. of hydrogen cyanide and 3.12 liters/min. of hydrogen measured at 0° C. and 760 mm. absolute pressure was passed through the fluidized solids catalyst for a period of about 12 hr. This gas flow represented a ratio of acetylene to hydrogen cyanide of 3.3:1 and hydrogen constituted 52% by volume of the total gas. As the reaction proceeded, the temperature of the catalyst increased to a maximum of about 560° C. and was maintained at that level throughout the reaction period.

The product gas was passed through a glass wool filter to remove any catalyst dust and then into a gas sampling system. Samples of the gas were taken and analyzed for the major product, acrylonitrile, and for by-products, particularly propionitrile and acetonitrile. The ultimate yield of acrylonitrile based on HCN and calculated from the analytical data obtained was 89.5% while conversion was 94.5%. By-product yield, i.e., propionitrile plus acetonitrile was about 10%.

EXAMPLE 2

A catalyst was prepared using another sample of the same calcined, hydrogenated charcoal and impregnating it with a mixture of sodium and potassium carbonates in a manner similar to that used in Example 1 and in the same proportions by weight but without the incorporation of the vanadate.

A sample of a similar volume of this catalyst preparation was evaluated by the same procedure described in Example 1, using the same mole ratios, temperature, etc. In a run of comparable time, the ultimate yield of acrylonitrile in this instance was only 82.5% representing a decrease of about 7% over that in Example 1 while conversions were about the same. In this run also by-product make of propionitrile and acetonitrile was 12.7% as compared to 10% obtained when the catalyst contained the promoter.

EXAMPLE 3

The experiments of Examples 1 and 2 were repeated at a somewhat lower temperature, the temperature being maintained in these runs between 520° C. and 525° C. Results are tabulated below.

| | | |
|---|---|---|
| Vanadate in Catalyst, percent | 1.6 | None |
| Ultimate Yield of Acrylonitrile, percent | 91.5 | 90 |
| Conversion, percent | 93 | 76 |
| By-Products, percent (Propionitrile+Acetonitrile) | 6.6 | 9.8 |

A comparison of the by-product formation obtained in the foregoing examples demonstrates that the incorporation of the vanadium compound into the catalyst preparation in every case significantly reduces the amount of by-products, such as propionitrile and acetonitrile, and generally effects an improvement in yield or conversion.

While specific catalyst compositions and operating conditions have been given in the examples, both are subject to considerable variation without departing from the scope of the invention. For example, any type of unactivated wood charcoal may be used as the inert catalyst support. Either hardwood or soft wood charcoals are suitable. The temperature at which the unactivated charcoal is calcined may vary from 500–1000° C. or higher. The time required for calcining, which is done to devolatilize the charcoal and rid it of undesirable impurities, depends to a great extent upon the type of charcoal employed and the temperature. In general, it varies from 2 to 8 hours or more. A time of about 6 hours at about 900° C. is satisfactory in most instances. Likewise, the hydrogenation treatment of the charcoal may be effected at any temperature within the range from 500–900° C. for a period of time ranging anywhere from 2 to 8 hours or more. Here again, satisfactory charcoal supports are produced with a hydrogenation treatment of about six hours.

The particular mesh size of the charcoal support is not critical. If a fluidized solids technique is used, very fine material must be avoided because the gas stream will carry it out of the fluidized catalyst reaction zone. On the other hand, if the particles are too large, the use of the fluidized solids method will be difficult if not impossible. More freedom with respect to particle size and particle size distribution is permissible if fixed or stationary catalyst beds are used. In general, in fixed beds, considerably larger sized particles may be used than in fluidized solid zones. That particle size is employed which provides optimum contact of reaction gases with the catalyst consonant with minimum pressure drop and other factors essential for good process performance. Particle size and reaction flow must be regulated so that the least possible amount of catalyst will be blown out of the reaction zone.

Instead of a 50–50 mixture of alkali metal carbonates as exemplified, the alkali metal carbonates may be used in varying proportions or they may be employed individually as the sole catalytic agent to be impregnated on the inactive support. In addition, salts other than the carbonates may be used separately or in admixture with each other. Also suitable are alkali metal cyanides, their hydroxides, borates, and the like. Generally, amounts of the catalytic agents employed range from about 3% to about 15% by weight of the inert support and, preferably, the charcoal is impregnated with about 10% weight of the alkali metal compound or mixture of compounds.

The amount of vanadium compound useful as a promoter in the improved catalyst of the invention is that in the range from about 0.2% to about 2.5% by weight of the entire catalyst composition including the support. Larger or smaller amounts may be used but they have little significant effects in suppressing the undesirable side reactions. The preferred catalyst composition contains from about 0.5 to about 1.5% of the vanadium compound. The vanadium promoter may be added to the catalyst in forms other than the ammonium vanadate. Examples of other suitable compounds are, for example, sodium, potassium, and barium meta vanadates. Some vanadium compounds such as vanadium oxychloride are difficult and hazardous to handle and, hence, the number of compounds suitable is limited by safety considerations.

The temperature range in the reactor may vary from about 450° C. to about 600° C. Preferably, the temperature is maintained in the range from about 520° to about 580° C. At these temperatures, the space velocity of the gases passing through the reactor is preferably maintained in the range from about 12 to about 20 min.$^{-1}$. Generally, however, the space velocity may range from about 10 to about 25 min.$^{-1}$. The reaction may be conducted at atmospheric pressure or the pressure in the reactor may be above atmospheric, pressures up to about 100 lb. per sq. in. being suitable.

The molar ratio of acetylene to hydrogen cyanide may vary rather widely from 1:1 to 6:1. Preferably, however, it is maintained in the range from 3:1 or 4:1 and at not less than about 2:1.

The examples show that high yields of acrylonitrile with lowered yields of undesired propionitrile and acetonitrile can be obtained with the improved promoted catalyst when an appreciable quantity of hydrogen is present. This makes it possible to employ a dilute stream of acetylene such as one produced by the Wulff process directly as a reactant in the process. The presence of other components in the acetylene stream such as methane, ethylene, nitrogen and carbon monoxide does not materially affect catalyst performance.

When hydrogen is employed as a diluent, the concentration of this gas in the reactant gas mixture may vary anywhere in the range from about 50 to 70% by volume.

What is claimed is:

1. The process for the production of acrylonitrile which comprises bringing a gaseous mixture of acetylene and hydrogen cyanide in which the mole ratio of acetylene to hydrogen cyanide is in the range from about 1:1 to 6:1 together with hydrogen as an inert diluent, said hydrogen constituting from about 50% to about 70% by volume of the reactant gas mixure, at a temperature in the range from about 450° C. to about 600° C. in contact with a catalyst consisting essentially of an inert support impregnated with a mixture of a substance selected from the group consisting of the alkali metal carbonates, hydroxides, and cyanides and from about 0.2% to about 2.5% by weight of a vanadate chosen from the group consisting of the alkali metal, alkaline earth metal and ammonium vanadates.

2. The process for the production of acrylonitrile which comprises bringing a gaseous mixture of acetylene and hydrogen cyanide in which the mole ratio of acetylene to hydrogen cyanide is in the range from 1:1 to 6:1 together with hydrogen as an inert diluent, said hydrogen constituting from about 50% to about 70% by volume of the reactant gas mixture, in contact, at a temperature within the range from about 520° C. to about 580° C., with a catalyst consisting essentially of a calcined hydrogenated wood charcoal impregnated with a mixture of a substance selected from the group consisting of the alkali metal carbonates, hydroxides, and cyanides and from about 0.5% to about 1.5% by weight of ammonium meta vanadate.

3. The process for the production of acrylonitrile which comprises bringing a gaseous mixture of acetylene and hydrogen cyanide in which the mole ratio of acetylene to hydrogen cyanide is in the range from 1:1 to 6:1 together with hydrogen as an inert diluent, said hydrogen constituting from about 50% to about 70% by volume of the reactant gas mixture, in contact, at a temperature in the range from about 520° C. to about 580° C., with a catalyst consisting essentially of a calcined hydrogenated charcoal impregnated with a mixture of alkali metal carbonates and from about 0.5% to about 1.5% by weight of ammonium meta vanadate.

4. The process of claim 3 wherein said charcoal is impregnated with from about 3% to about 15% by weight of a 50–50 mixture of sodium and potassium carbonates.

5. The process of claim 3 wherein said charcoal is impregnated with about 10% by weight of a 50–50 mixture of sodium and potassium carbonates.

References Cited in the file of this patent

UNITED STATES PATENTS

| | | |
|---|---|---|
| 2,419,186 | Harris et al. | Apr. 15, 1947 |
| 2,789,126 | Anderson et al. | Apr. 16, 1957 |